(12) United States Patent
Yu

(10) Patent No.: US 10,275,611 B1
(45) Date of Patent: Apr. 30, 2019

(54) METHODS AND APPARATUS FOR SHARING AND SEARCHING ENCRYPTED DATA

(71) Applicant: OverNest, Inc., Sunnyvale, CA (US)

(72) Inventor: Edward Liang Yu, Sunnyvale, CA (US)

(73) Assignee: OverNest, Inc., Sunnyvale, CA (US)

( * ) Notice: Subject to any disclaimer, the term of this patent is extended or adjusted under 35 U.S.C. 154(b) by 0 days.

(21) Appl. No.: 16/103,309

(22) Filed: Aug. 14, 2018

Related U.S. Application Data

(60) Provisional application No. 62/546,282, filed on Aug. 16, 2017.

(51) Int. Cl.
*H04L 21/00* (2006.01)
*G06F 21/62* (2013.01)
*G06F 17/30* (2006.01)
*H04L 9/06* (2006.01)

(52) U.S. Cl.
CPC .... *G06F 21/6218* (2013.01); *G06F 17/30625* (2013.01); *G06F 17/30634* (2013.01); *G06F 17/30952* (2013.01); *H04L 9/0643* (2013.01); *H04L 9/0662* (2013.01)

(58) Field of Classification Search
CPC .............................. H04L 9/0662; H04L 9/0643
See application file for complete search history.

(56) References Cited

U.S. PATENT DOCUMENTS 9,910,999 B1   3/2018  Yu
2008/0117991 A1   5/2008  Peddireddy et al.
2010/0145970 A1*  6/2010  Gorti .................. G06F 17/3066
707/759
2012/0330908 A1* 12/2012  Stowe ............... G06F 17/30955
707/693
2013/0073870 A1   3/2013  Sauerwald et al.
(Continued)

FOREIGN PATENT DOCUMENTS

WO    WO-2017/044595 A1    3/2017

OTHER PUBLICATIONS

International Search Report dated Dec. 9, 2016, for PCT Application No. PCT/US2016/050731, filed on Sep. 8, 2016, 2 pages.
(Continued)

*Primary Examiner* — Morshed Mehedi
(74) *Attorney, Agent, or Firm* — Cooley LLP

(57) ABSTRACT

In some embodiments, a method includes receiving, at an encrypted sharing server and from a source compute device, a share request to share first encrypted index data with a destination compute device. The method includes defining a data record including (1) information identifying the destination compute device and (2) a first set of logical block identifiers. The first set of logical block identifiers is generated based on unencrypted index data associated with the first encrypted index data and associated with a first set of storage locations. Each storage location from the first set of storage locations stores at least one index entry from a first set of index entries of the first encrypted index data. The method further includes receiving a search request associated with a search string and sending a signal to cause a subset of index entries to be sent to a destination compute device.

21 Claims, 7 Drawing Sheets

(56) References Cited

U.S. PATENT DOCUMENTS

| | | | | |
|---|---|---|---|---|
| 2015/0082399 A1* | 3/2015 | Wu | ................... | G06F 21/6209 |
| | | | | 726/6 |
| 2015/0143112 A1* | 5/2015 | Yavuz | ................ | G06F 17/3033 |
| | | | | 713/165 |
| 2016/0085790 A1* | 3/2016 | Gukal | ................... | G06F 17/40 |
| | | | | 707/741 |
| 2016/0299924 A1 | 10/2016 | Fujimoto et al. | | |
| 2017/0068477 A1 | 3/2017 | Yu | | |

OTHER PUBLICATIONS

Written Opinion of the International Searching Authority dated Dec. 9, 2016, for PCT Application No. PCT/US2016/050731, filed on Sep. 8, 2016, 5 pages.

* cited by examiner

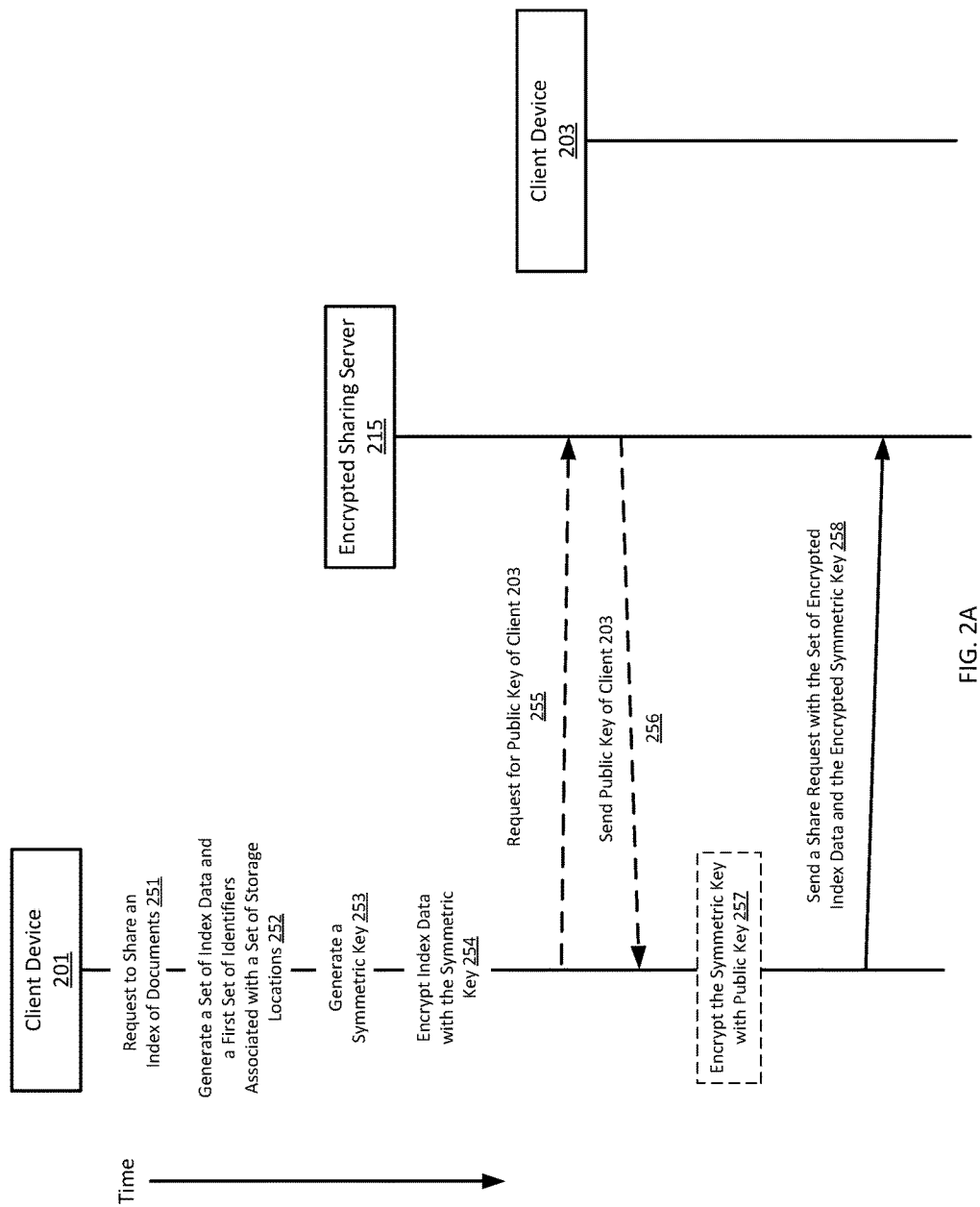

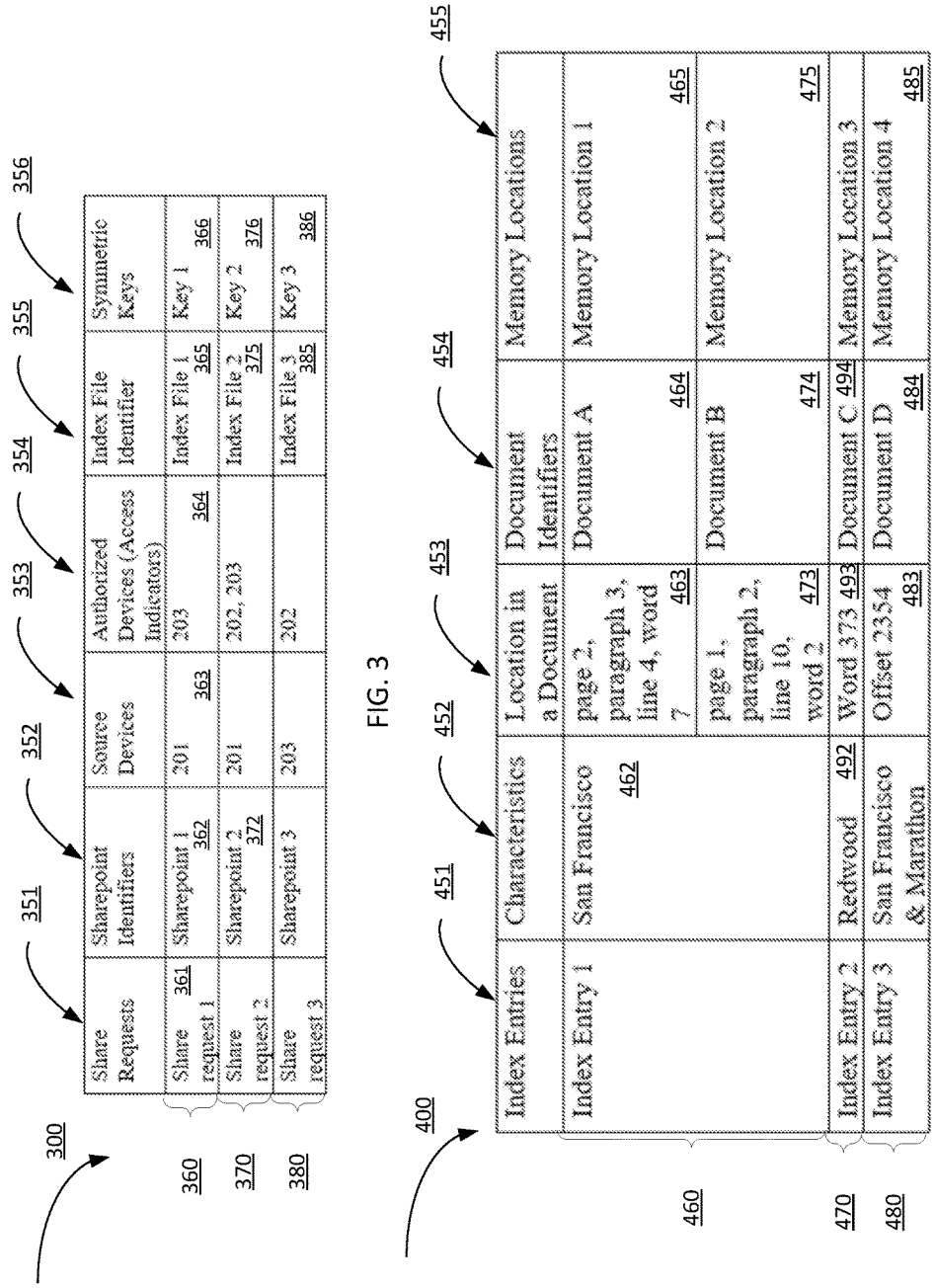

METHODS AND APPARATUS FOR SHARING AND SEARCHING ENCRYPTED DATA

CROSS REFERENCE TO RELATED APPLICATIONS

This application claims priority to provisional application U.S. Ser. No. 62/546,282, filed on Aug. 16, 2017, and entitled "Methods and Apparatus for Sharing and Searching Encrypted Data", which is incorporated herein by reference in its entity.

This application is related to U.S. patent application Ser. No. 15/425,463 (now U.S. Pat. No. 9,910,999), filed on Feb. 6, 2017 and entitled "Methods and Apparatus for Encrypted Indexing and Searching Encrypted Data," which is incorporated herein by reference in its entity.

BACKGROUND

Some embodiments described herein relate generally to methods and apparatus for sharing and searching encrypted data and/or documents. In particular, but not by way of limitation, some embodiments described herein relate to methods and apparatus for sharing a subset of a set of encrypted data and searching encrypted indexes associated with the subset of the set of encrypted data.

Some enterprises are known to encrypt their electronic files containing sensitive data for security and privacy concerns. Sharing encrypted data with other users and allowing these users to search among the encrypted data based on content within the encrypted data can be challenging. Some known solutions that allow sharing a subset of encrypted documents with other users, however, do not support searching among the subset of encrypted documents. Some known solutions that support searching present a security problem because searchable data are not encrypted and are therefore open to security attacks.

Accordingly, a need exists for improved methods and apparatus for securely sharing and searching encrypted data.

SUMMARY

In some embodiments, a method includes receiving, at an encrypted sharing server and from a source compute device, a share request to share first encrypted index data with a destination compute device. The method includes defining, at the encrypted sharing server, a data record based on the share request. The data record includes (1) information identifying the destination compute device and (2) a first set of logical block identifiers. The first set of logical block identifiers is generated based on unencrypted index data associated with the first encrypted index data and associated with a first set of storage locations. Each storage location from the first set of storage locations stores at least one index entry from a first set of index entries of the first encrypted index data. The method further includes receiving, at the encrypted sharing server and from the destination compute device, a search request to receive second encrypted index data associated with a search string. The search request includes a second set of logical block identifiers generated based on the search string and associated with a second set of storage locations. Each storage location from the second set of storage locations stores at least one index entry from a second set of index entries of the second encrypted index data. The method includes identifying, at the encrypted sharing server and based on the information identifying the destination compute device in the data record, a subset of logical block identifiers included in the first set of logical block identifiers and the second set of logical block identifiers. The subset of logical block identifiers is associated with a subset of index entries included in the first set of index entries and the second set of index entries. The method further includes sending, from the encrypted sharing server and based on the subset of logical block identifiers, a signal to cause the subset of index entries to be sent to the destination compute device in response to the search request such that the destination compute device can decrypt the subset of index entries to identify an index entry from the subset of index entries.

BRIEF DESCRIPTION OF THE DRAWINGS

FIGS. 2A-2B are logical representation of data exchange between an encrypted sharing server, client devices, and a backend storage, according to an embodiment.

FIG. 3 is a table illustrating an example data structure of a sharepoint file, according to an embodiment.

FIG. 4 is a table illustrating a data structure of an index file, according to an embodiment.

DETAILED DESCRIPTION

Figure 1:
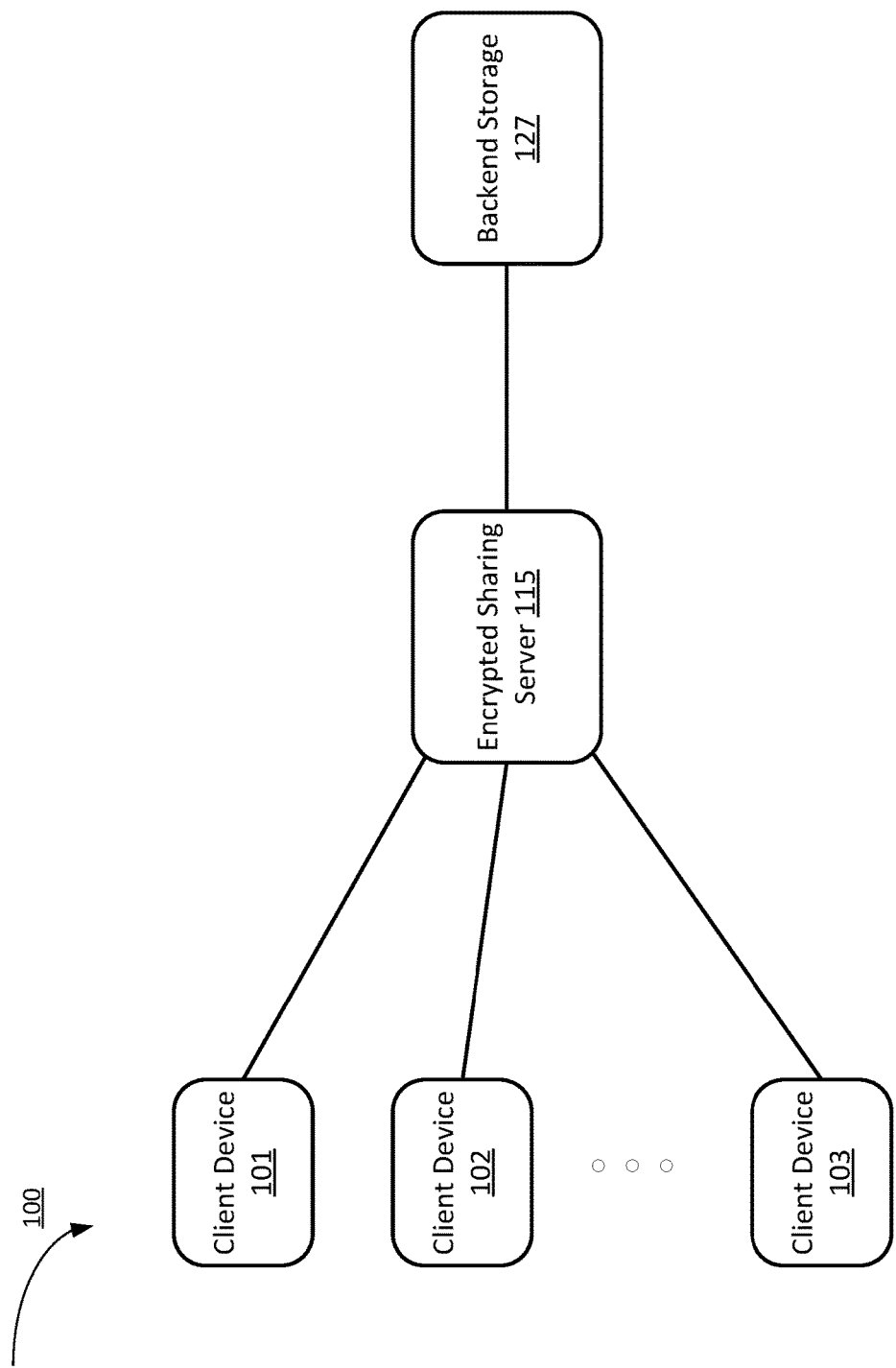
FIG. 1 is a schematic block diagram of an encrypted sharing system, according to an embodiment.

In some embodiments, a method includes receiving, at an encrypted sharing server and from a source compute device, a share request to share first encrypted index data with a destination compute device. The method includes defining, at the encrypted sharing server, a data record based on the share request. The data record includes (1) information identifying the destination compute device and (2) a first set of logical block identifiers. The first set of logical block identifiers is generated based on unencrypted index data associated with the first encrypted index data and associated with a first set of storage locations. Each storage location from the first set of storage locations stores at least one index entry from a first set of index entries of the first encrypted index data. The method further includes receiving, at the encrypted sharing server and from the destination compute device, a search request to receive second encrypted index data associated with a search string. The search request includes a second set of logical block identifiers generated based on the search string and associated with a second set of storage locations. Each storage location from the second set of storage locations stores at least one index entry from a second set of index entries of the second encrypted index data. The method includes identifying, at the encrypted sharing server and based on the information identifying the destination compute device in the data record, a subset of logical block identifiers included in the first set of logical block identifiers and the second set of logical block identifiers. The subset of logical block identifiers is associated with a subset of index entries included in the first set of index entries and the second set of index entries. The method further includes sending, from the encrypted sharing server and based on the subset of logical block identifiers, a signal to cause the subset of index entries to be sent to the destination compute device in response to the search request such that the destination compute device can decrypt the subset of index entries to identify an index entry from the subset of index entries.

An apparatus includes a memory and a processor operatively coupled to the memory. The processor is configured to generate, based at least in part on a set of index entries of index data, a set of logical block identifiers associated with a set of storage locations. Each storage location from the set of storage locations stores at least one index entry from the set of index entries. The processor is configured to encrypt the set of index entries with an encryption key to define a set of encrypted index entries. The processor is further configured to send a share request to share the set of encrypted index entries with a compute device such that the compute device can send an encrypted search request, based on a search string, to search for and retrieve at least one encrypted index entry from the set of encrypted index entries. The share request includes (1) information identifying the compute device and (2) the set of logical block identifiers.

In some embodiments, an apparatus includes a memory and a processor operatively coupled to the memory. The processor is configured to receive, from a first client device, a share request to share a set of encrypted documents from multiple encrypted documents with a second client device. In some implementations, each encrypted document from the set of encrypted documents is encrypted with an encryption key. The processor is configured to generate a copy of each encrypted document from the set of encrypted documents and store the copy of each encrypted document from the set of encrypted documents at a set of memory locations from multiple memory locations. The processor is configured to define, based on the share request, a data record (such as a sharepoint) including an access indicator associated with the first client device (i.e., the source device) and the second client device (i.e., the destination device). Each sharepoint can be associated with an index file (or index data), the contents of which associate a set of characteristics from the set of encrypted documents with a set of document identifiers. In some implementations, the index file (or index data) is encrypted and stored at a backend storage operatively coupled to the processor. Each document identifier from the set of document identifiers is uniquely associated with an encrypted document from the set of encrypted documents. The processor is configured to store the sharepoint in the memory.

In some embodiments, an apparatus includes a memory and a processor operatively coupled to the memory. The processor is configured to receive, from the second client device, a request to access a set of index data. In some implementations, the user of the second client device provides a search string to the second client device. The second client devices generates, based on the search string, a set of identifiers (e.g., a set of pseudorandom logical block identifiers) associated with a set of storage locations at which the set of index data are stored. In such implementations, the second client device sends the set of identifiers to the processor. The processor is configured to identify a set of data records (such as a set of sharepoints) to which the second client device is authorized to access. The processor is configured to retrieve the set of encrypted index data, using the set of sharepoints, from the set of storage locations storing the set of encrypted index data, and send the set of encrypted index data to the second client device. The second client device can decrypt the set of encrypted index data. The second client device can receive a selection from the user and send a signal to the processor to retrieve an encrypted document from a set of encrypted documents listed in the set of index data. Upon receiving the encrypted document from the processor, the second client device can decrypt the encrypted document for further processing or display.

In some embodiments, an encrypted sharing system can be configured to, for example, allow a user to share encrypted documents with other users, provide, to these users, index searching capabilities on these encrypted documents, and at the same time maintain the secrecy of the encrypted documents from the encrypted sharing server. For example, a first user, operating a first client device, has access to a first set of encrypted documents stored at an encrypted sharing server. A second user, operating a second client device, has access to a second set of encrypted documents stored at the encrypted sharing server. The first user desires to share, with the second user, a subset of the first set of encrypted documents (i.e., a third set of encrypted documents). Thus, the second user is authorized to access the second set of encrypted documents and the third set of encrypted documents. The encrypted sharing server is configured to provide, to the second user, index searching capabilities on both of the second set of encrypted documents and the third set of encrypted documents. At the same time, the encrypted sharing server is configured to ensure that the contents of these encrypted documents remain encrypted to the encrypted sharing server. In other words, the second user can request to access a set of encrypted index data from the encrypted sharing server and search in the set of encrypted index data that the second user is authorized to access (i.e., the second set of encrypted documents and the third set of encrypted documents). The encrypted sharing server can be configured to retrieve the encrypted document(s) that the second user selects from the multiple encrypted documents listed in the search results and send the encrypted document(s) to the second user. During the encrypted data sharing and searching processes, information related to the encrypted documents (e.g., contents of the encrypted documents, the share request, the search request, the search results, etc.) remain encrypted and confidential to the encrypted sharing server.

In some embodiments, an encrypted sharing system, for example, can be a storage system configured to store data without storing and/or maintaining, for example, the data's meta-data, content of the data, a key used to encrypt the data, a storage location of the data within the storage system, a storage operation associated with storing the data, and/or the like. The encrypted sharing system can be configured to store encrypted and unencrypted data (e.g., index data, index files, documents, sharepoint files, a sharepoint data record, encryption keys such as public keys, and/or the like).

In some implementations, an encrypted sharing system, for example, can be configured to generate, maintain, update and store sharepoint files. A sharepoint file can store multiple sharepoints or sharepoint data records. Based on the sharepoint files, the encrypted sharing system can be configured to determine data that a client device is authorized to access. In some implementations, an encrypted sharing system, for example, can be configured to retrieve a set of locations in a memory where encrypted index data (or any data, document, file) are stored and compile an index file (or any data, document, file).

In some embodiments, a sharepoint file can be, for example, a file or collection of data that records access rights to data stored at the encrypted sharing system. In some implementations, each sharepoint (i.e., a sharepoint data record) from a set of sharepoints in the sharepoint file is generated in response to a share request and each sharepoint identifies client devices that are authorized in the share request and the files that are authorized to be shared in the share request. In some implementations, the set of sharepoints in the sharepoint file can be stored as a data record in a table structure, a tree structure, and/or the like in a database. An exemplary data structure of a sharepoint file is discussed in detail with respect to FIG. 3.

In some embodiments, an "index file" can be, for example, a computer file or collection of data with an index that allows retrieval of relevant information or documents based on a search query (or a search string). The index file can be generated (e.g., by a client device, an index server, an encrypted sharing server, or other compute device) by parsing components (e.g., words, letters, or meta-data) of a set of documents or other form of media and inserting the parsed components into forward or inverted indices. Such document parsing (similar to search engine indexing) can involve natural language processing. The terms "indexing", "parsing", and "tokenization" are used interchangeably herein.

For example, an index file can include a set of index entries. Each index entry from the set of index entries defines an association of a characteristic (e.g., a word, a letter, a phrase, or meta-data) in a set of documents with a set of information associated with the characteristic in the set of documents. The set of information can include, for example, a document identifier from a set of document identifiers for each document from the set of documents, a set of locations of the characteristic in the set of documents, a set of statistical information associated with the characteristic in the set of documents (e.g., the number of times the characteristic appears in the set of documents, the portions of the documents typically including the characteristic, etc.), a relationship information associated with a relationship between a first characteristic in the set of documents and a second characteristic in the set of documents (e.g., the proximity of and/or distance between two words in the documents from the set of documents, the portions of the document including the first characteristic and/or the second characteristic, the type of documents containing the first characteristic and/or the second characteristic, etc.), and/or the like.

For example, the index file (or index data) can include an index entry defining an association of the phrase "San Francisco" with (1) the document identifier of each document that has the phrase "San Francisco", (2) the location in the storage (e.g., backend storage 127 of FIG. 1) of each document that has the phrase, (3) the location of the phrase in each document (e.g., page 2, paragraph 3, line 4), (4) how many times the phrase appears in each document, (5) the other words that are in the same sentence of the phrase in each document, (6) the document identifier of each document that has the phrase "San Francisco" and the phrase "software engineer," and/or the like. Additional details regarding encrypted indexing and searching can be found in U.S. patent application Ser. No. 15/425,463 (now U.S. Pat. No. 9,910,999), which has been incorporated herein by reference in its entirety. An example data structure of an index file is discussed in detail with respect to FIG. 4.

The term "meta-data" refers to information of the data that is not contained in the content of the data but nevertheless can be kept and/or identified by a storage system. For example, for a file document, the meta-data can include a file name, file size, file type, file location, file author, and/or the like.

The term "document" can refer to, for example, a document, a data structure, data and/or a file stored in a storage system. A document can be, for example, an index file, a data file, a video, an image, a webpage, a message such as email or a chat message, a record in a database system, and/or the like.

The term "storage operations" can refer to, for example, operations or actions supported by a storage system. Typical operations can include, for example, read, write, update, append, delete, search, query, index, and/or the like.

The term "storage" refers to any suitable storage system such as, for example, a physical storage system or a cloud-based storage system. A storage includes a memory that allows storage of document(s) that can be subsequently retrieved.

The term "storage unit" refers to, for example, a unit of storage used by a storage system. For instance, for a file system (e.g., Microsoft® Windows New Technology File System (NTFS)), the storage unit can be a file; for a database system (e.g., MySQL® database), the storage unit can be a record or a row; for an object store (e.g., Amazon® S3), the storage unit can be an object; and for a block-based storage array (e.g., DataDirect™ Networks), the storage unit can be a block. For a backend storage, internally the storage unit can be a logical block. Other storage units can include, for example, a bucket, a slot, a record, a blob and/or a box.

The term "encryption" refers to, for example, any cryptographic method to encode a document so that only authorized parties can read/access the encoded document. The term "decryption" refers to any cryptographic method to decode a document so that the encoded document can be decoded and read (or accessed) by authorized parties, devices, modules, and/or components.

As used herein, a module can be, for example, any assembly and/or set of operatively-coupled electrical components, and can include, for example, hardware like a memory, a processor, software (executing in hardware), and/or the like. As used herein, the singular forms "a," "an" and "the" include plural referents unless the context clearly dictates otherwise. Thus, for example, the term "a backend storage" is intended to mean a single backend storage or multiple backend storages with similar functionalities. For another example, the term "an index file" is intended to mean a single index file or multiple index files.

FIG. 1 is a schematic block diagram of an encrypted sharing system 100, according to an embodiment. In some embodiments, the encrypted sharing system 100 includes client devices 101-103, an encrypted sharing server 115, and a backend storage 127. The encrypted sharing server 115 is operatively coupled to each of the client devices 101-103 and the backend storage 127. In some embodiments, the encrypted sharing server 115, the backend storage 127, and the client device (e.g., 101-103) are stored and/or executed on separate compute devices communicatively coupled together via a network (e.g., the Internet, a local area network (LAN), a wide area network (WAN), and/or the like) (not shown). Such compute devices can include processors (e.g., to execute modules, to use application program interfaces (APIs), and/or the like) and memories (e.g., to store data and/or instructions for execution by the processors). In other embodiments, the functions of the encrypted sharing server 115, the backend storage 127, and the client device (e.g., 101-103) can be stored and/or executed on a common compute device.

Each client device 101-103 can be a compute device (or multiple compute devices) having a processor and a memory. For example, the client device 101-103 can be or include a computer, a cell phone, a tablet, an electronic device, a critical embedded system, coprocessors, a field-programmable gate array (FPGA), a document management system, a file system, another storage system, or any system that uses a storage system to store data for its operation(s). In some implementations, client devices 101-103 can support a set or a subset of operations similar to read, write, update, append, and delete. In some instances, the client devices 101-103 can communicate with the encrypted sharing server 215 via a network (e.g., the Internet, an intranet, a local area network (LAN), a virtual private network (VPN), a wireless LAN (WLAN), a wired network, a wireless network and/or the like). Each client device 101-103 can be structurally and/or functionally similar to the other client device 101-103. Discussions related to, for example, client device 101 can be similarly applied to client device 102 and/or client device 103.

The backend storage 127 can be configured to store documents and/or other forms of data. The backend storage 127 can be, for example, a device(s) to implement a cloud storage service such as, for example, Amazon Web Services (AWS)™, Microsoft Azure™, or a physical storage array, or can be an in-memory database, file system, or a data structure. Examples of files and/or data that can be securely stored in the backend storage 127 include an encrypted index file (e.g., a secure index of encrypted data that can be used to search the encrypted data), encrypted index data, encrypted documents, sharepoint files, data records, encrypted symmetric keys, public keys of client devices, other identifiers associated with client devices (e.g., Media Access Control (MAC) addresses, Internet Protocol (IP) addresses), and/or the like. For other examples, any other suitable file and/or data can be stored in the backend storage 127. In some implementations, the backend storage 127 can support two operations equivalent to download and upload (such as receive/send or read/write). The encrypted sharing server 115 can translate the upload and download operations to the operations supported by the backend storage 127. The backend storage 127 can use an internal storage unit. Some common terms used by the backend storage 127 for each of the units can be, for example, a bucket, an object, a slot, a record, a blob, a box, and/or a file. Additional details regarding an example backend storage 127 can be found in U.S. patent application Ser. No. 15/259,863, which has been incorporated herein by reference in its entirety.

The encrypted sharing server 115 can be a compute device (or multiple compute devices) having processing capabilities. In some instances, the encrypted sharing server 115 can be any combination of hardware-based module (e.g., a field-programmable gate array (FPGA), an application specific integrated circuit (ASIC), a digital signal processor (DSP)) and/or software-based module (computer code stored in memory and/or executed at the processor 520 in FIG. 5). In some instances, the encrypted sharing server 115 can be a server such as, for example, a web server, an application server, a proxy server, a telnet server, a file transfer protocol (FTP) server, a mail server, a list server, a collaboration server and/or the like. In other instances, the encrypted sharing server 115 can be a personal computing device such as a desktop computer, a laptop computer, a personal digital assistant (PDA), a standard mobile telephone, a tablet personal computer (PC), and/or so forth.

In some implementations, the encrypted sharing server 115 can be configured to receive a share request from a first client device 101 (or a source compute device) to share a set of encrypted documents (or encrypted data such as encrypted index data) with a second client device 103 (or a destination compute device). The encrypted sharing server 115 can be configured to provide an encrypted document (or an encrypted index entry) from the set of encrypted documents to the second client device 103, in some implementations, in response to a request from the second client device 103, as described in further detail herein.

In some implementations, the encrypted sharing server 115 can be, for example, configured to generate, maintain, update and store sharepoint files. Based on the sharepoint files, the encrypted sharing system can be configured to determine which data a client device is authorized to access. In some instances, the encrypted sharing server 115 can be, for example, configured to retrieve, based on a request (or a search string, or a set of identifiers associated with a set of storage locations), index data (or any data, document, file) from a set of locations in a memory and compile a search result (e.g., a search result file and/or search result data) from the index data. The encrypted sharing server 115 can then be configured to retrieve document information (e.g., document identifiers) associated with a signal from a client device 101-103 and send such document information to a client device 101-103. Details of the encrypted sharing server 115 are discussed below with regards to FIG. 5.

Figure 2B:
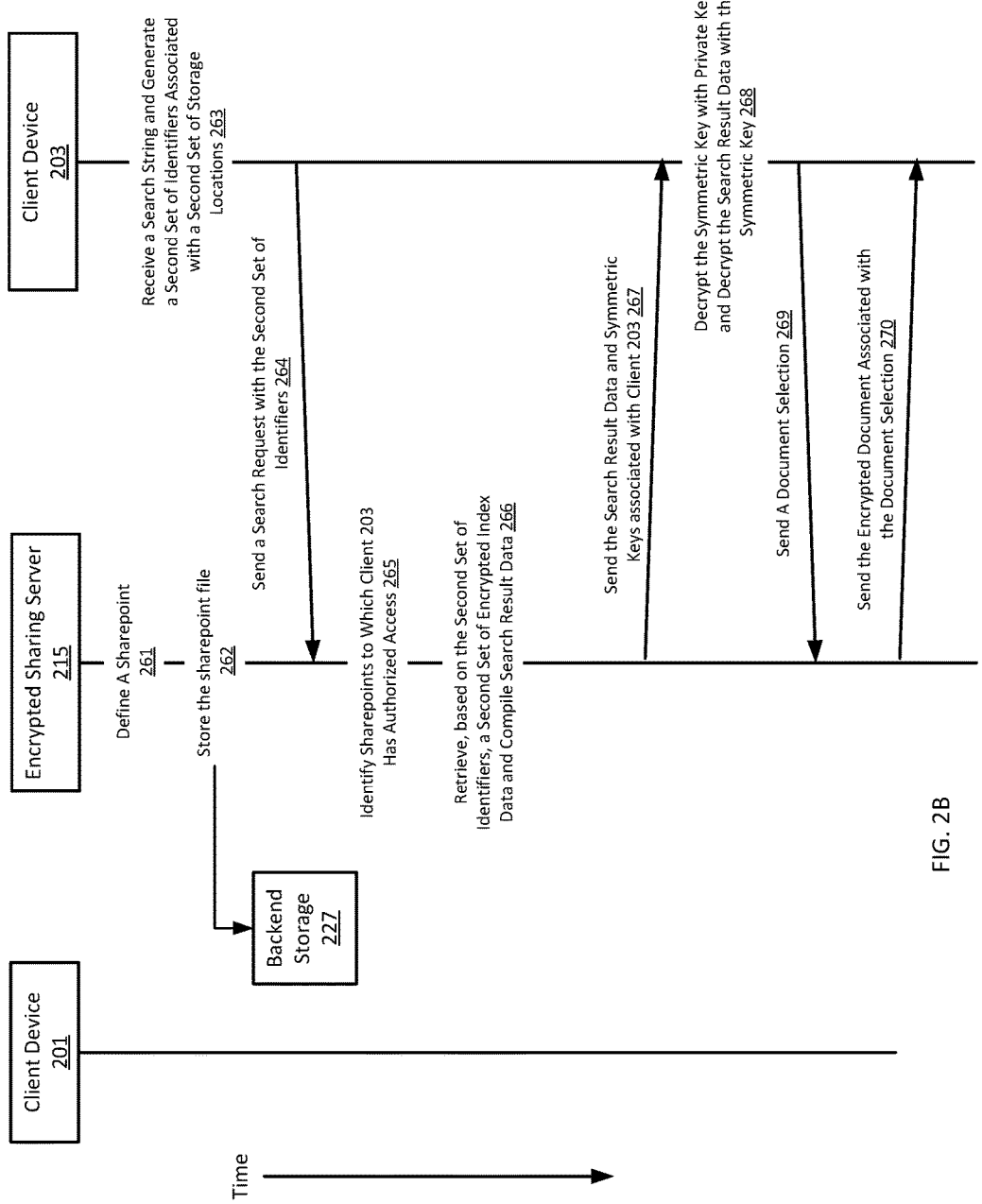

FIGS. 2A-2B are logical representations of data exchange between the encrypted sharing server 215, the client device 201, the client device 203, and the backend storage 227 according to an embodiment. The encrypted sharing server 215, the client device 201, the client device 203, and the backend storage 227 are structurally and/or functionally similar to the encrypted sharing server 115, the client device 101, the client device 103, and the backend storage 127, respectively, described above with respect to FIG. 1.

In use, a user of a client device 201 can provide an input to the client device 201 (i.e., a source compute device) to share an index of a first set of documents from a second set of documents with a client device 203, at 251. The request to share the index of the first set of documents can be based on a request to share the first set of documents with the client device 203. The first set of documents can be a subset of the second set of documents, or the same as the second set of documents. The client device 201, prior to receiving the input to share from the user, is authorized to access the second set of documents, and can define and/or have an index file associated with the second set of documents (i.e., the second index file). In some implementations, each document from the second set of documents and the second index file can be encrypted and stored at the backend storage 227. In other instances, the second index file can be encrypted and stored at the backend storage 227, while the second set of documents can be stored at a storage different from the backend storage 227.

Upon receiving the input to share the index of the first set of documents at 251, the client device 201 can generate a first index file (i.e., first index data, or first unencrypted index data) associated with the first set of documents, at 252. In some implementations, the client device 201 can generate an index identifier associated with the index file and calculate a first set of identifiers (e.g., a set of pseudorandom logical block identifiers) associated with a set of storage locations at the backend storage 227 based on the index identifier, at 252. Each storage location from the set of storage locations stores at least one index entry from a set of index entries of the first index file. In some instances, the first set of identifiers can be a set of logical block identifiers (e.g., a set of pseudorandom logical block identifiers). In some instances, the client device 201 can generate a logical block identifier from a set of logical block identifiers based on an index entry from a set of index entries in the first index file. For example, the client device 201 can generate the set of logical block identifiers using a cryptographic pseudorandom hash function with at least a portion of the first index file (e.g., an index entry) as an input to the cryptographic pseudorandom hash function.

As further described herein, in such implementations the client device 201 can parse the index file into a set of index data and encrypt each index data from the set of index data to generate encrypted index data. The client device 201 can then store each encrypted index data at a different storage location from the set of storage locations at the backend storage 227, as indicated by a different identifier from the first set of identifiers.

In some implementations, the first set of documents are encrypted and stored at the backend storage 227. The client device 201 can retrieve the encrypted first set of documents from the backend storage 227, decrypt the encrypted first set of documents, and generate the first index file associated with the first set of documents. In other implementations, the first set of documents are stored in a location other than the backend storage 227 from which the client device 201 can retrieve the first set of documents and generate the first index file.

In some implementations, the client device 201 can encrypt the first index file (or first index data) with an encryption key (e.g., a symmetric key) for enhanced security. The client device 201 can generate the encryption key, at 253, randomly, using a hash function, using an algorithm (e.g., Advanced Encryption Standard (AES)), and/or using any cryptographic method to encrypt the first index file so that only authorized parties (i.e., devices with the symmetric key) can read/access the encrypted first index file. As such, in some implementations, client device 201 can share the symmetric key with client device 203. As discussed above, in other instances the client device 201 can parse the index file and/or data into multiple portions (e.g., a set of index data) and encrypt each portion of the index file and/or data with the encryption key (e.g., the symmetric key). Each portion of the index file and/or data can be treated similar to the index file by the encrypted sharing server 215, as described herein.

In some instances, to share the symmetric key with client device 203, the client device 201 can optionally encrypt the symmetric key with a public key of the client device 203 such that the client device 203 can subsequently decrypt the symmetric key with its private key to receive the symmetric key. For example, in some instances, the public key of each client device using the encrypted sharing system can be stored at the encrypted sharing server 215 and the corresponding private key of each client device can be stored at that client device. The client device 201 can send a request, at 255, to the encrypted sharing server 215 to retrieve the public key of client device 203. In response to the request, the encrypted sharing server 215 can send the public key of client device 203 to the client device 201, at 256. In such instances, the client device 201 can encrypt the symmetric key with the received public key of the client device 203, at 257. In other instances, the client device 201 can use any other suitable method to securely share the symmetric key with the client device 203.

The client device 201 can send a signal including a share request to the encrypted sharing server 215, at 258. In some implementations, the share request can include (1) an identifier of the source client device, i.e., client device 201, (2) an identifier of the client device 203 (i.e., a destination compute device), (3) the first index file or data (e.g., encrypted with the symmetric key), (4) a first set of logical block identifiers, and/or (5) the encryption key (e.g., the symmetric key encrypted with the public key of client device 203). In some instances, the share request, as a whole, can be encrypted within a single encryption step and/or using a single encryption technique. In other instances, each entry in the share request can be encrypted separately. For example, the client device 201 can encrypt only the first index file or data in the share request, while leaving the other information in the share request unencrypted. For another example, the client device 201 can encrypt the index file or data, and the symmetric encryption key in the share request, while leaving the other information in the share request unencrypted. In other instances, as described above, a share request can include one or more portions of the index file or data (e.g., encrypted using the symmetric key). In yet other instances, the encrypted sharing server 215 does not store the index data in an unencrypted form.

Moving to FIG. 2B, upon receiving the share request, the encrypted sharing server 215 can define a data record (such as, for example, a sharepoint) based on the share request, at 261. The encrypted sharing server 215 can subsequently update a sharepoint file to include a reference to the newly-defined sharepoint and store the updated sharepoint file in the backend storage 227 and/or at the encrypted sharing server 215, at 262. FIG. 3 is a table illustrating an example data structure of a sharepoint file 300, according to an embodiment. In some implementations, the sharepoint file 300 can include a share requests column 351 listing share request identifiers, a sharepoint column 352 listing sharepoint identifiers associated with each share request, a source devices column 353 listing the client device that sends the share request, an authorized (destination) devices (i.e., access indicators) column 354 listing the client device(s) with which the source device requests to share documents in the share request, an index file identifier column 355 listing the index file identifier that identifies the encrypted index file or index data (or portion of the index file or index data) that the source client device requests to share, and/or a symmetric keys column 356 listing the symmetric key (e.g., encrypted using the public key(s) of the authorized devices) used to encrypt the index file (or index data) associated with the share request. In some implementations, the index file identifiers in column 355 can be a file name of the encrypted index file, a memory location of the encrypted index file, a set of memory locations of a set of portions of the encrypted index file (or index data), or a set of logical block identifiers storing the encrypted index file. In other words, the index file associated with the share request can be encrypted using the symmetric key in the symmetric key column 356. For example, index file 1 365 is encrypted with key 1 366, index file 2 375 is encrypted with key 2 376, and index file 3 385 is encrypted with key 3 386. In some implementations, the symmetric key column 356 is optional.

In some implementations, for example, upon receiving a share request 1 361, the encrypted sharing server 215 can define a data record (such as, for example, a sharepoint) 360 and update the sharepoint file 300 with the new sharepoint 360. The sharepoint file 300 has previously-defined sharepoints, e.g., 370 and 380, that are associated with previously-received share request 2 and share request 3, respectively. The newly-defined sharepoint 360 includes (1) a share request identifier 361, share request 1; (2) a sharepoint identifier 362, sharepoint 1; (3) a source device identifier 363 that indicates that client device 201 sent the share request 1 to the encrypted sharing server 215 to share Index File 1; (4) an authorized (or destination) device identifier 364 that indicates that the Index File 1 will be shared with client device 203; (5) an index file identifier 365 that points to where the encrypted index file associated with the first set of documents is stored in the backend storage 227 (or a set of identifiers that point to where each portion of the encrypted index file is stored in the backend storage 227); and (6) an encrypted symmetric key 366 that is used to encrypt the index file 1 365. The symmetric key 366 can be encrypted by the public key of client device 203. Similarly, client device 202 and client device 203 are both authorized to access the Index File 2 375. Thus, a first instance of the symmetric key 376 can be encrypted by the public key of client device 202 and a second instance of the symmetric key 376 can be encrypted by the public key of client device 203. Client device 202 can subsequently decrypt the symmetric key 376 with the private key of client device 202 and decrypt the encrypted search result data (or the encrypted search result file) with the symmetric key 376. Similarly, client device 203 can subsequently decrypt the symmetric key 376 with the private key of client device 203 and decrypt the encrypted search result data (or the encrypted search result file) with the symmetric key 376.

In some instances, a data record (such as, for example, a sharepoint) 360, 370, or 380, can be a "tree-like" structure with each document or each set of documents being a "leaf". For example, a sharepoint can be a tree with one "leaf" that corresponds to one document to be shared. In some instances, a sharepoint can also be a tree having intermediate nodes. For example, a folder having a set of documents to be shared can be an intermediate node. Under the intermediate node, there are leaves representing documents. Each leaf corresponds to each (encrypted) document from the set of (encrypted) documents in the folder. In some implementations, the sharepoint structure can have any suitable number of layers and/or folders. In other implementations, the sharepoint can be represented as any other suitable data structure.

In some implementations, the share request can include a parameter that indicates a period of time during which the share request is active, or an expiring timestamp after which the share request will not be valid. In other words, the authorized client device can access the Index File 1 only for the period of time, or the authorized client device will lose the access to the Index File 1 after the expiring timestamp is reached. The encrypted sharing server 215 can define a sharepoint based on the share request in response to receiving the share request and remove the sharepoint after the period of time or after the expiring timestamp is reached.

Returning to FIG. 2B, in some instances, at a time after the sharepoint is defined and stored at the encrypted sharing server 215 at 261 and 262, respectively, client device 203 can receive a search string (commands, words, texts, numbers, and/or the like) from a user. Client device 203 can generate, based on the search string, a second set of identifiers associated with a second set of storage locations at the backend storage 227, at 263. In some implementations, similar to the first set of identifiers, the second set of identifiers can be a set of logical block identifiers (e.g., a set of pseudorandom logical block identifiers). In some instances, client device 203 can identify a seed based at least in part on the search string, and can calculate the set of logical block identifiers based on the seed. In other instances, client device 203 can identify the set of logical block identifiers using a cryptographic pseudorandom hash function with the seed as an input to the cryptographic pseudorandom hash function. In such instances, the seed can be at least a portion of the search string.

The encrypted sharing server 215 can receive, from client device 203, a search request with the second set of identifiers, or a request to access the Index File 1 (e.g., in a search request or part of a larger document request), at 264. The search request can include an identifier of client device 203. The encrypted sharing server 215 can identify, based on the identifier of client device 203, in the sharepoint file (e.g., sharepoint file 300 in FIG. 3) sharepoints that client device 203 is authorized to access, at 265. For example, in sharepoint file 300 in FIG. 3, the encrypted sharing server 215 can search for sharepoints 360-380 where the authorized devices column 354 includes the identifier of client device 203. The authorized devices column 354 of sharepoint 360 and sharepoint 370 include the identifier of client device 203. Subsequently, the encrypted sharing server 215 can retrieve index file identifiers associated with encrypted index file 1 365 and encrypted index file 2 375 associated with sharepoint 360 and sharepoint 370, respectively.

Based on the sharepoints to which client device 203 has authorized access, and based on the search request with the second set of identifiers, the encrypted sharing server 215 can retrieve a set of encrypted index data associated with the second set of identifiers, at 266. In some instances, the set of encrypted index data that client device 203 is not authorized to access is mutually exclusive from the set of encrypted index data that client device 203 is authorized to access.

The encrypted sharing server 215 can then compile encrypted search result data (or an encrypted search result file) based on the set of encrypted index data, at 267. The encrypted sharing server 215 can then send the encrypted search result data (or the encrypted search result file) to client device 203, together with encrypted symmetric key 1 366 and/or encrypted symmetric key 2 376, at 267 (depending on which symmetric keys are associated with the set of encrypted index data retrieved based on the second set of identifiers). At 268, the client device 203 can then decrypt the symmetric keys with the private key of client device 203 and decrypt the encrypted search result data (or the encrypted search result file) with symmetric key 366, or symmetric key 376, or a combination of symmetric keys 366 and 376.

In some embodiments, instead of sending a compiled search result file relevant to the search string, the encrypted sharing server 215 can send encrypted Index File 1 365 and encrypted Index File 2 375 to client device 203, together with encrypted symmetric key 1 366 and encrypted symmetric key 2 376. The client device 203 can then decrypt the symmetric keys with the private key of client device 203 and decrypt Index File 1 365 and Index File 2 375 with their respective decrypted symmetric keys 366 and 376. Once decrypted, the client device 203 can search in Index File 1 and Index File 2, generate search results, and optionally remove any duplicate listings from the search results (for example, in response to the Index File 1 365 and Index File 2 375 being decrypted).

In some instances, each encrypted index file from a set of encrypted index files to which client device 203 has access is sent to client device 203. In other instances, client device 203 can send a request to the encrypted sharing server 215 to access a subset of the encrypted index files based on a sharepoint. For example, client device 203 can send a request to the encrypted sharing server 215 to access the encrypted index files associated with sharepoint 2 372. For another example, client device 203 can send a request to the encrypted sharing server 215 to access the encrypted index files shared by source device 201. In such a manner, sharepoints can be defined specific to user groups and/or teams and can be used to reduce the number of documents returned when a client device (e.g., client device 203) requests index files. In some instances, prior to sending the compiled search result file to client device 203, the encrypted sharing server 215 can remove each duplicate copy of an encrypted index entry in the complied search file to define a subset of index entries such that the subset of index entries is sent to the compute device 203 to decrypt and process.

In some embodiments, once decrypted, the client device 203 can select a document (encrypted) of interest listed in the search result file and send a document selection signal to the encrypted sharing server 215 to retrieve the document, at 269. Upon receiving the document selection signal, the encrypted sharing server 215 can retrieve the encrypted document from the memory locations at the backend storage and send the encrypted document to client device 203, at 270. The client device 203 can decrypt the encrypted document for further processing or display.

In some instances, these documents are encrypted with symmetric keys (similar to the index file) and/or are associated with one or more sharepoints that indicate client device 203 can access these documents (or the memory locations associated with the documents). The client device 203 can retrieve the symmetric keys from the encrypted sharing server 215 and decrypt these documents using the symmetric keys for display or further processing. In some instances, these symmetric keys are encrypted by the public key of client device 203 (similar to the index file). The client device 203 can then decrypt the symmetric keys with the private key of client device 203 and then decrypt the documents with the symmetric keys for display or further processing. In some instances, these documents are encrypted with the public key of client device 203. The client device 203 can decrypt these documents with the private key of client device 203 for display or further processing.

While shown and described in FIGS. 2A and 2B as sharing an index file, in other implementations, any other document, file or data can be stored in the backend storage and shared with other client devices. For example, instead of an index file, a word processor document, a spreadsheet, an image, a video and/or the like can be stored in the backend storage. Specifically, the client device 201 can encrypt the document with a symmetric key and send the encrypted document to the encrypted sharing server 215. The encrypted sharing server 215 can define a sharepoint for the document as associated with the client device 201 and can store the document in the backend storage 227. Subsequently, when the client device 201 requests access to the document, the encrypted sharing server 215 can use the sharepoint to identify that the client device 201 is authorized to access the document (using the sharepoint), locate the document in the back end storage 227, and return the document to the client device 201. The client device 201 can decrypt the document using the symmetric key. In some implementations, other documents associated with the client device 201 can be included in the sharepoint and can be encrypted with the symmetric key.

The client device 201 can send a request to the encrypted sharing server 215 to share the document with the client device 203. The encrypted sharing server 215 or the client device 201 can make a copy of the document (e.g., in encrypted form) and define a new sharepoint that authorizes both the client device 201 and the client device 203 to access the copy of the document. The client device 201 can also share the symmetric key with the client device 203 or define a new symmetric key with which to encrypt the copy of the document. The new symmetric key can be shared with the client device 203. The client device 201 can share the symmetric key associated with the copy of the document as described above. Accordingly, when the client device 203 requests to access the document, the encrypted sharing server 215 can identify that the client device 203 is authorized to access the document (i.e., by reviewing the sharepoint) and can send the document to the client device 203. The client device 203 can then decrypt the document using the symmetric key. Thus, any document can be securely stored and shared using the encrypted sharing server 215. Specifically, the document can be stored and shared without the encrypted sharing server 215 or the backend storage 227 having access to the contents of the document.

FIG. 4 is a table illustrating a data structure of an index file 400, according to an embodiment. In some instances, the index file 400 can include a set of index entries 460, 470, 480. Each index entry from the set of index entries 460, 470, and 480 defines an association of a characteristic 452 (e.g., a word, a letter, a phrase, or meta-data) in a set of documents with a set of information associated with the characteristic 452 in the set of documents. The set of information can include, for example, a document identifier from a set of document identifiers 454 for each document from the set of documents, a set of locations 453 of the characteristic in the set of documents, a set of statistical information associated with the characteristic in the set of documents (e.g., the number of times the characteristic appears in the set of documents, the portions of the documents typically including the characteristic, etc.) (not shown), a relationship information associated with a relationship between a first characteristic in the set of documents and a second characteristic in the set of documents (e.g., the proximity of and/or distance between two words in the documents from the set of documents, the portions of the document including the first characteristic and/or the second characteristic, the type of documents containing the first characteristic and/or the second characteristic, etc.) (not shown), and/or the like. Each index entry, 460-480, can also include an identifier of the index entry 451 and a memory location 455 of each document. The memory location 455 can be the actual memory location of each document or a set of pseudorandom numbers associated with memory locations of a set of portions of the document.

For example, the index file 400 can include index entry 1 460 defining an association of phrase "San Francisco" 462 with a set of information in Document A 464 and Document B 474. Document A 464 includes the phrase "San Francisco" 462 at page 2, paragraph 3, line 4, and word 7 463. Document A 464 is stored in Memory Location 1 465 of a backend storage (e.g., backend storage 127 in FIG. 1). Document B 474 also includes the phrase "San Francisco" 462, which appears at page 1, paragraph 2, line 10, and word 2 473. Document B 474 is stored in Memory Location 2 475 of the backend storage (e.g., backend storage 127 in FIG. 1). In some instances, the location in a document 453 can be represented as an offset in a file. For example, in index entry 2 470, the location of the word "Redwood" 492 in Document C 494 is word 373 493. For another example, the location of a word can aalso be an offset in a file (e.g., offset 2354 of a binary file.)

In some instances, for example, when client device 201 sends a share request to share document A, document B, document C, and document D (i.e., a first set of documents) with client device 203, client device 201 can generate an index file 400, defining an association of a set of characteristics 452 in the first set of documents with a set of information (453, 454, 455) of the first set of documents. The client device 201 can parse index file 400 into a set of index data and store the index data from the set of index data at a different location from a set of storage locations at the backend storage 227. For example, the client device 201 can parse index file 400 into three subsets of index data. Each subset of index data corresponds to an index entry, 460 470, or 480. In other words, Index Entry 1 460 is parsed into a subset of index data. Index Entry 2 470 is parsed into a subset of index data. Index Entry 3 480 is parsed into a subset of index data.

For Index Entry 1 460, for example, the client device 201 can use "San Francisco" 462 as an input to a hash function and generate a set of logical block identifiers. The client device can then encrypt the subset of index data associated with Index Entry 1 460 with a symmetric key and send the encrypted subset of index data to the encrypted sharing server 215 to store the encrypted index data at a different location of a set of storage locations, as indicated by a different identifier of the set of logical block identifiers. In this manner, the location in memory associated with the Index Entry 1 460 is associated with the content of Index Entry 1 460.

Upon receiving the share request from client device 201, the encrypted sharing server 215 can define a sharepoint (e.g., sharepoint 360 in FIG. 3) associated with the share request and store the encrypted set of index data at a backend storage.

Subsequently, client device 203 can receive a search string (commands, words, texts, numbers, and/or the like) from a user and generate, based on the search string, a second set of identifiers associated with a second set of storage locations at the backend storage 227. For example, the user of client device 203 provides a search string of "San Francisco" and the client device 203 can use "San Francisco" as an input to the hash function and generate a second set of logical block identifiers. Client device 203 can then send the second set of logical block identifiers to the encrypted sharing server 215.

The encrypted sharing server 215 can determine a set of sharepoints to which client device 203 is authorized to access and retrieve the encrypted index data stored at the second set of logical block identifiers and associated with each sharepoint of the set of sharepoints. In this example, client device 203 is authorized to access sharepoint 360 in FIG. 3 which is associated with index file 1, i.e., index file 400 in FIG. 4. Upon receiving the encrypted index data stored at the second set of logical block identifiers, the client device 203 can decrypt the encrypted index data. If the search strings include "San Francisco", the client device 203 can generate an encrypted search result listing "page 2, paragraph 3, line 4, word 7" 483, document A 464, and memory location 1, 465. If the user of client device 203 selects to retrieve document A 464, the encrypted sharing server 215 can retrieve encrypted document A 464 from memory location 1 465 from the backend storage 227 and send the encrypted document A 464 to the client device 203.

Figure 5:
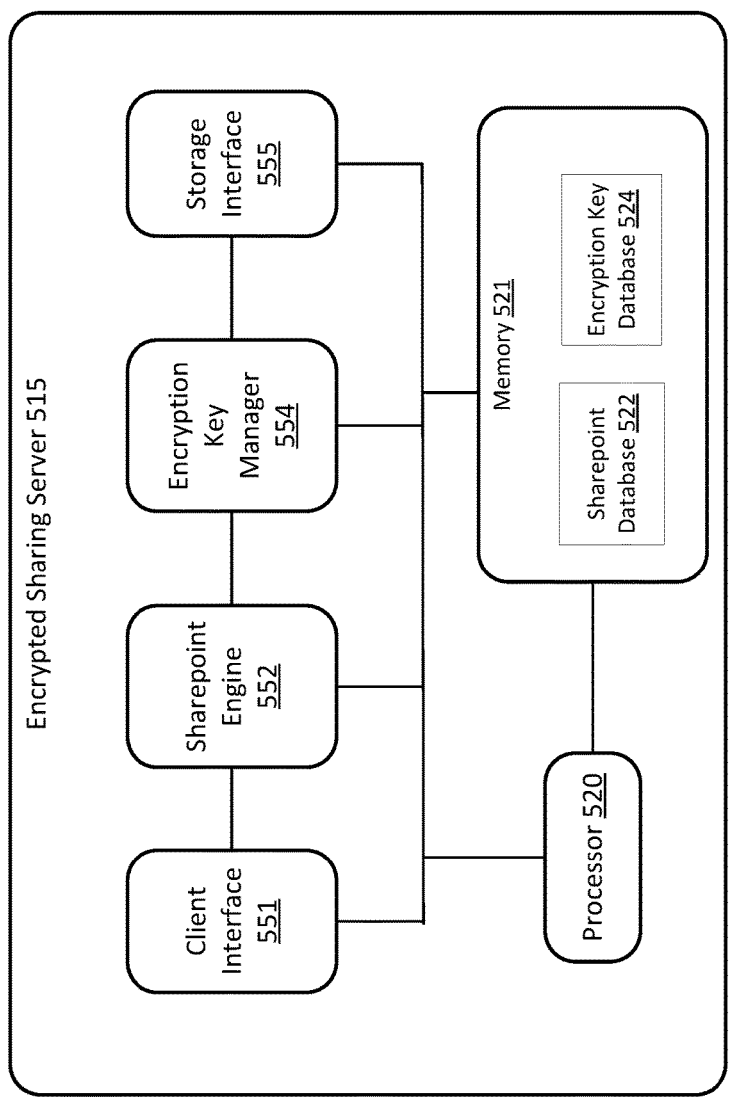
FIG. 5 is a schematic block diagram of an encrypted sharing server, according to an embodiment.

FIG. 5 is a schematic block diagram of an encrypted sharing server 515, according to an embodiment. The encrypted sharing server 515 can include a client interface 551, a sharepoint engine 552, an encryption key manager 554, a storage interface 555, a processor 520, and a memory 521. The memory 521 can include a sharepoint database 522 and an encryption key database 524. In some instances, the encrypted sharing server 515 can include an encryption module (not shown) and a decryption module (not shown). The encrypted sharing server 515 can be structurally and functionally similar to the encrypted sharing server 115 discussed with respect to FIG. 1 and/or the encrypted sharing server 215 discussed with respect to FIG. 2.

Each operation(s) of the client interface 551, the sharepoint engine 552, the encryption key manager 554, and the storage interface 555 can be controlled and/or executed by the processor 520. Each module or component in the encrypted sharing server 515 can be any combination of hardware-based modules (e.g., a field-programmable gate array (FPGA), an application specific integrated circuit (ASIC), a digital signal processor (DSP)) and/or software-based modules (a module of computer code stored in memory 521 and/or executed at the processor 520) capable of performing one or more specific functions associated with that module. Each module or component in the encrypted sharing server 515 can be operatively coupled to the other modules/components in the encrypted sharing server 515. As discussed herein, the encrypted sharing server 515 and its components can be stored and/or executed on a server, host device, client device, and/or the like. In some embodiments, some components of the encrypted sharing server 515 can be stored and/or executed on a first device (e.g., a server) and other components of the encrypted sharing server 515 can be stored and/or executed on a second device (e.g., a client device) operatively coupled to the first device via a network (e.g., the Internet).

In some instances, the client interface 551 is operatively coupled with a client device (such as the client device 101 in FIG. 1) and the sharepoint engine 552. The sharepoint engine 552 is operatively coupled with the encryption key manager 554, and the storage interface 555. In some instances, the storage interface 555 is operatively coupled with a backend storage (such as the backend storage 127 in FIG. 1).

The client interface 551 is a translation layer of the encrypted sharing server 515 that interfaces with the client device (such as the client device 101 in FIG. 1). Depending on the client device, the client interface 551 can support different client device storage application programming interfaces (APIs). Functionality-wise, the client interface 551 can support share, search, read, write, update, append, delete requests and/or other suitable instructions. In some cases, the client interface 551 can receive a request (e.g., a share request, or an access request) from the client device and can then translate the request to a uniform request and/or a request used and recognized by the components of the encrypted sharing server 515. The client interface 551 can also translate an identifier used by the client device (also referred herein to as client identifier) to a storage system identifier used by the rest of the system (e.g., the remaining modules of the encrypted sharing server 515 and/or the backend storage).

The sharepoint engine 552 can be configured to define a data record, such as, for example, a sharepoint in response to receiving a share request from a client device (i.e., source client device) or from the client interface 551. In some implementations, the share request can include (1) an identifier of the source client device, (2) an identifier of an authorized (destination) client device (with which the source client device shares data or documents), (3) an index file or data (e.g., encrypted with the symmetric key), (4) a set of logical block identifiers associated with a set of storage locations that stores the index file, and/or (5) an encryption key (e.g., the symmetric key encrypted with the public key of the authorized client device). In some instances, the encryption key manager 552 can retrieve, from the encryption key database 524, a public key associated with the authorized client device and can send the public key to the source client device. The source client device can then encrypt the symmetric key with the public key associated with the authorized client device prior to sending the symmetric key to the encrypted sharing server 515.

The sharepoint engine 552 can define, based on the share request, a data record, such as, for example, a sharepoint (e.g., 360 in FIG. 3) that includes (1) a share request identifier, (2) a sharepoint identifier, (3) a source device identifier, (4) an authorized device identifier, (5) an index file identifier 365 that points to where the encrypted index file/data associated with the first set of documents is stored in the backend storage (or a set of logical block identifiers associated with a set of storage locations that stores the index file/data), and/or (6) an encrypted symmetric key that is used to encrypt the index file/data. The sharepoint engine can update a sharepoint file (e.g., 300 in FIG. 3) including a set of sharepoints (e.g., 360, 370, and 380 in FIG. 3) with the newly-defined sharepoint and store the updated sharepoint file into the sharepoint database 522 in the memory 521.

In some implementations, the share request can include a parameter that indicates a period of time during which the share request is active, or an expiring timestamp after which the share request will not be valid. In other words, the authorized client device can access the shared documents only for the period of time, or the authorized client device will lose access to the shared documents after the expiring timestamp is reached. The encrypted sharing server 515 can define a sharepoint based on the share request in response to receiving the share request and remove and/or delete the sharepoint after the period of time or after the expiring timestamp is reached.

The sharepoint engine 552 can receive a search request (having, for example, a set of identifiers associated with a set of storage locations at an backend storage) from a client device or the client interface 551. The sharepoint engine 552 can identify, based on the identifier of the client device, in the sharepoint file (e.g., sharepoint file 300 in FIG. 3) sharepoints that the client device is authorized to access. The sharepoint engine 552 can retrieve, via the storage interface 555, encrypted index data associated with the search string stored at each storage location from the set of storage locations using the set of logical block identifiers. After the set of encrypted index data associated with the search request have been retrieved, the sharepoint engine 552 can compile encrypted search result data (or an encrypted search result file) based on the set of encrypted index data and send the encrypted search result data/file to the client interface 551.

In the implementations where the index files are encrypted, the encryption key manager 554 can retrieve, from the encryption key database 524, the encryption keys (e.g., symmetric keys) associated with the index files. In some instances, the encryption key manager 552 can retrieve, from the encryption key database 524, a public key associated with a client device (and used by a client device to encrypt a symmetric key prior to sending the encrypted symmetric key to the encrypted sharing server 515).

In some embodiments, the client device can send a document selection signal to the client interface 551 to retrieve a document based on the search result. The client interface 551 can send a signal to the storage interface 555 and retrieve from the memory locations at the backend storage (not shown) the encrypted document(s) indicated in the document selection and send the document(s) to the client device. In some instances, these documents are encrypted with symmetric keys and the symmetric keys are encrypted with the public key of the client device. The client device can send a signal to the encryption key manager 554 and retrieve the encrypted symmetric keys from the encryption key database 524. The client device can then decrypt the symmetric keys with its private key and decrypt these documents using the symmetric keys for display or further processing. In some instances, these symmetric keys are encrypted by the public key of client device. The client device can then decrypt the symmetric keys with the private key of client device and then decrypt the documents with the symmetric keys for display or further processing. In other instances, the documents can be encrypted with the public key of client device. In such instances, the client device can decrypt the documents with the private key of client device for display or further processing.

The encryption key manager 554 can be configured to maintain, manage, update, add, and/or remove encryption keys. The encryption key manager 554 can store and retrieve the encryption keys to and from the encryption key database 524. The encryption key manager 554 can respond to requests from the client device and send encrypted or unencrypted symmetric keys and/or public keys to the client device. In some instances, the encryption key manager 554 can store public keys of client devices to the encryption key database 524 such that when a first client device retrieves the public key of a second client device, the first client device can encrypt a symmetric key with the public key of the second client device and initiate a share request.

The storage interface 555 can be configured to interface with a backend storage (not shown; e.g., backend storage 127 in FIG. 1). The storage interface 555 can handle reading/writing to the backend storage using an API or abstraction exposed by the backend storage and mapping logical block used by the sharepoint engine 552 and the encryption key manager 554 to the storage unit used by the backend storage. For example, if AWS S3 is used, the storage interface 555 API will use the S3 API to upload and download encrypted storage unit to the S3 system. The storage interface 555 can translate the logical blocks of data used by the encrypted sharing server 515 (or a client device) to the S3 storage units such as buckets and/or objects. The storage interface 555 can be configured to hide and/or obscure the different interfaces (APIs) of the underlying backend storage so the encrypted sharing server 515 can treat the backend storage as a "dumb" storage system with only upload or download operations. This allows the backend storage to be agnostic and pluggable from the perspective of the client devices and their users. Accordingly, different backend storage and/or protocols can be used. This also allows the backend storage to secure either a cloud storage system and/or a physical storage array. In some instances, data passing through the storage interface 555 is encrypted prior to being sent to the backend storage.

The memory 521 can be, for example, a random-access memory (RAM) (e.g., a dynamic RAM, a static RAM), a flash memory, a removable memory, a hard drive, a database and/or so forth. In some implementations, the memory 521 can include (or store), for example, a database, process, application, virtual machine, and/or other software modules (stored and/or executing in hardware) and/or hardware modules configured to execute an encrypted sharing process, an encrypted searching process and/or one or more associated methods for the backend storage. In such implementations, instructions for executing the encrypted sharing process, the encrypted searching process and/or the associated methods can be stored within the memory 521 and executed at the processor 520. In some implementations, the memory 521 can include a sharepoint database 522 and/or an encryption key database 524. The encryption key database 524 can store encrypted symmetric keys and public keys of client devices.

The processor 520 can be configured to, for example, write data into and read data from the memory 521, and execute the instructions stored within the memory 521. The processor 520 can also be configured to execute and/or control, for example, the operations of the client interface 551, the sharepoint engine 552, the encryption key manager 554, and the storage interface 555. Similarly stated, the functions and/or operations described with respect to the encrypted sharing server 515 (and associated modules) can be implemented and/or executed by processor 520. In some implementations, based on the instructions stored within the memory 521, the processor 520 can be configured to execute the encrypted sharing process and the encrypted retrieving process described herein with respect to FIGS. 6-7.

Figure 6:
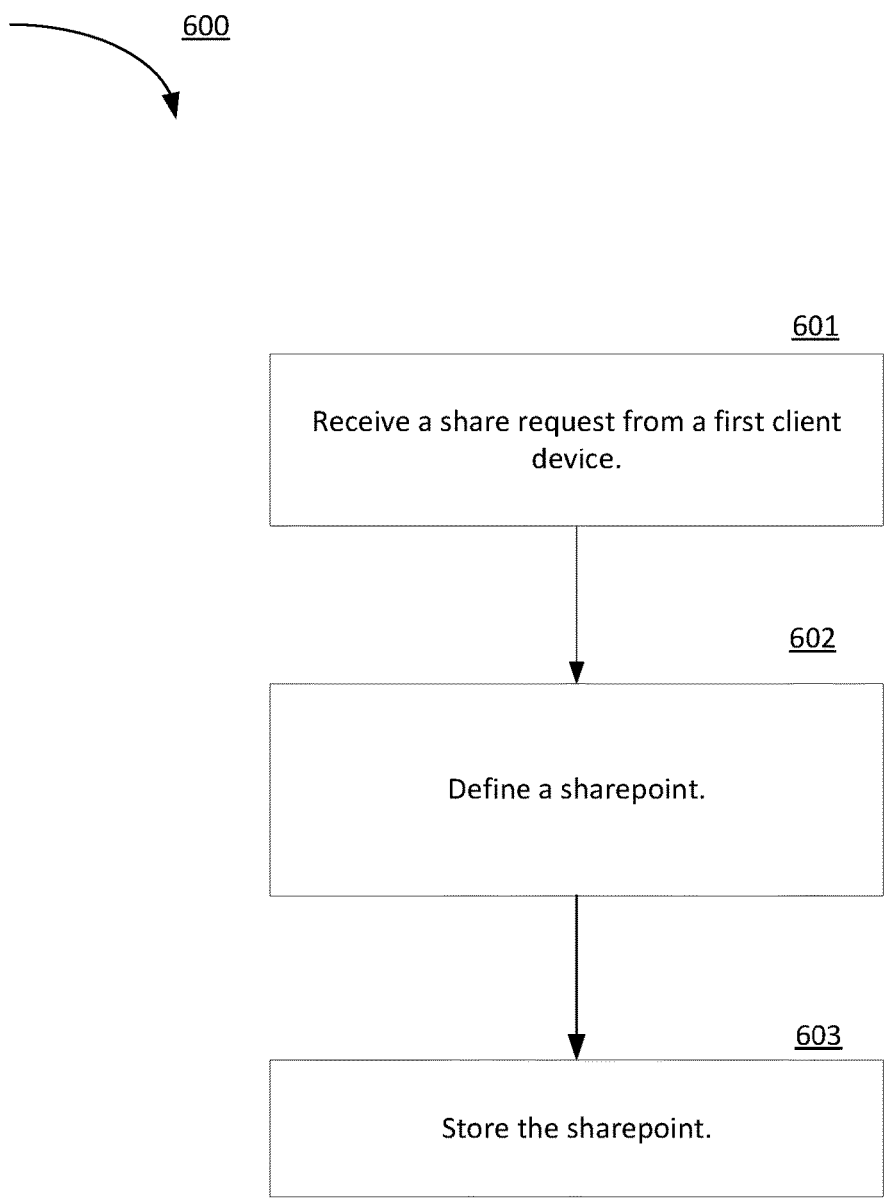
FIG. 6 is a flowchart illustrating an encrypted sharing process, according to an embodiment.

FIG. 6 is a flowchart illustrating an encrypted sharing process 600, according to an embodiment. This encrypted sharing process 600 can be implemented at a processor and/or a memory (e.g., processor 520 or memory 521 as discussed with respect to FIG. 5 of a an encrypted sharing server, such as the encrypted sharing server 115 in FIG. 1, the encrypted sharing server 215 in FIG. 2, and/or the encrypted sharing server 515 in FIG. 5).

At 601, the encrypted sharing server receives a share request from a first client device (or a source compute device) to share a first set of documents (or a first set of data) from a second set of documents (or a second set of data) with a second client device (or a destination compute device). The first set of documents can be a subset of the second set of documents, or the same as the second set of documents. Prior to sending the share request, the first client device defines an index file associated with the second set of documents (i.e., the second index file).

In some implementations, the first client device generates an index identifier associated with the index file and calculates a first set of identifiers associated with a set of storage locations at the backend storage based on the index identifier. In some instances, the first set of identifiers can be a set of logical block identifiers (e.g., a set of pseudorandom logical block identifiers). The first client device generates the set of logical block identifiers using a cryptographic pseudorandom hash function with the index data as an input to the cryptographic pseudorandom hash function. In such implementations, the first client device parses the index file into a set of index data, encrypts the index data from the set of index data, and stores the encrypted index data from the set of encrypted index data at a different storage location from the set of storage locations at the backend storage, as indicated by a different identifier from the first set of identifiers.

In some implementations, each document from the second set of documents and the second index file can be encrypted and stored at a backend storage. In other instances, the second index file can be encrypted and stored at the backend storage, while the second set of documents can be stored at a storage different from the backend storage. The first client device can remove the encryption of each document of the second set of documents and generate a first index file associated with the first set of documents. In some implementations, the first client device then encrypts the first index file with an encryption key (e.g., a symmetric key) and encrypts each document from the first set of documents with the same encryption key or a different encryption key. In some instances, the first client device can optionally encrypt the symmetric key with a public key of the second client device such that the second client device can subsequently decrypt the symmetric key with its private key to receive the symmetric key.

In some implementations, the share request includes (1) an identifier of the first client device, (2) an identifier of the second client device, (3) the first index file/data (e.g., encrypted with the symmetric key), (4) a set of logical block identifiers associated with a set of storage locations storing the first index file/data, and/or (5) the encryption key (e.g., the symmetric key encrypted with the public key of the second client device).

At 602, the encrypted sharing server defines a data record such as, for example, a sharepoint based on the share request. The sharepoint can include, for example, (1) a share request identifier, (2) a sharepoint identifier, (3) a first device identifier that indicates that the first client device sent the share request to the encrypted sharing server to share a first set of documents, (4) a second device identifier that indicates that the first set of documents will be shared with the second client device, (5) an index file identifier that points to where the first index file/data associated with the first set of documents is stored in the backend storage (or a set of logical block identifiers), and/or (6) an encrypted symmetric key that is used to encrypt the first index file/data. The symmetric key can be encrypted by the public key of second client device. At 603, the encrypted sharing server stores the sharepoint at the encrypted sharing server.

In some implementations, the share request can include a parameter that indicates a period of time during which the share request is active, or an expiring timestamp after which the share request will not be valid. In other words, the authorized client device can access the shared documents only for the period of time, or the authorized client device will lose the access to the shared documents after the expiring timestamp is reached. The encrypted sharing server 215 can define a sharepoint based on the share request in response to receiving the share request and remove the sharepoint after the period of time or after the expiring timestamp is reached.

Figure 7:
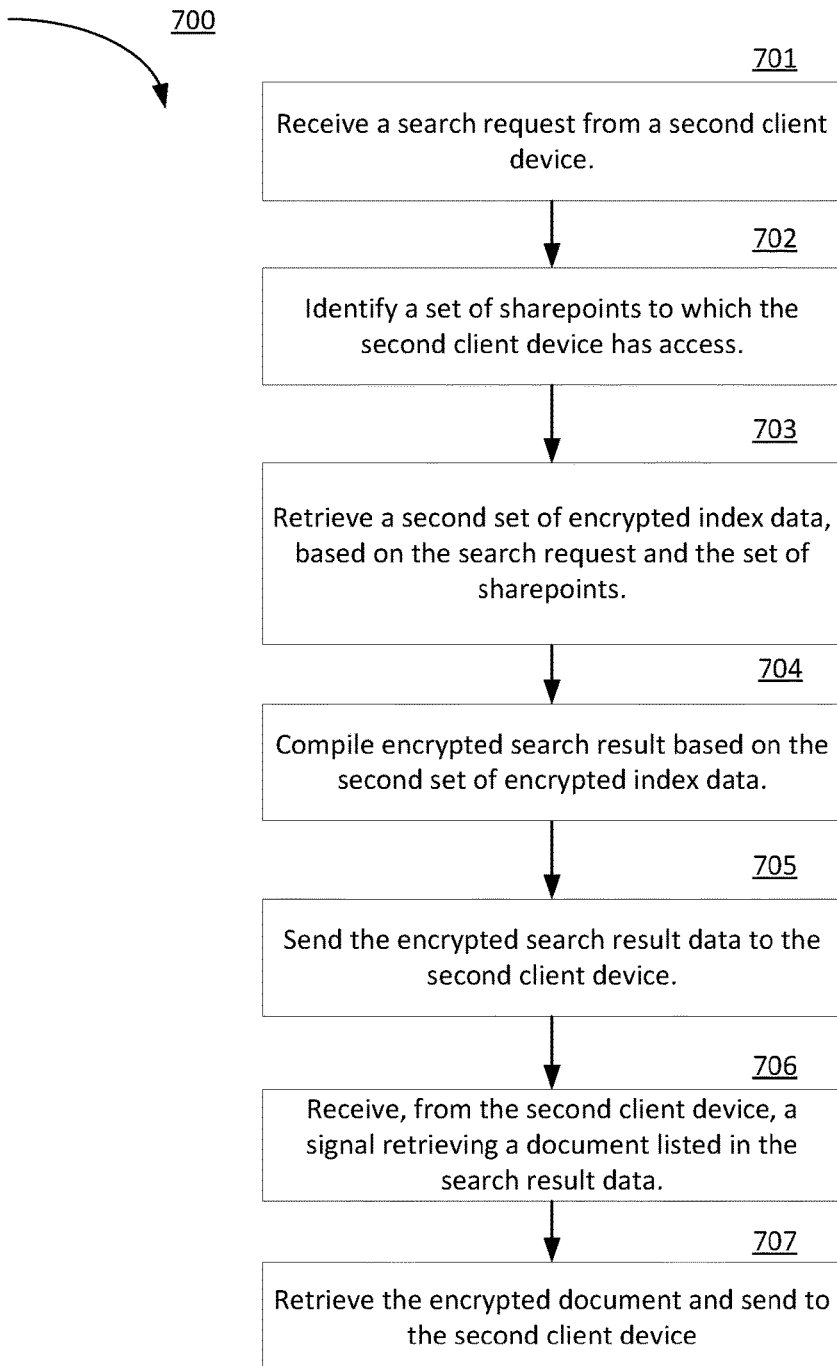
FIG. 7 is a flowchart illustrating an encrypted searching process, according to an embodiment.

FIG. 7 is a flowchart illustrating an encrypted searching process, according to an embodiment. This encrypted searching process 700 can be implemented at a processor and/or a memory (e.g., processor 520 or memory 521 as discussed with respect to FIG. 5 of an encrypted sharing server, such as the encrypted sharing server 515 in FIG. 5).

At 701, the encrypted sharing server receives, from a second (or destination) client device, a search request (having, for example, a second set of identifiers associated with a set of storage locations at a backend storage). The search request can include an identifier of the second client device. In some instances, in addition to the identifier of the second client device, the request can include a sharepoint identifier to access the index file(s)/data associated with a specific sharepoint, an identifier of the source client device to access the index file(s)/data associated with a specific source device, and/or other similar criteria.

At 702, the encrypted sharing server identifies a set of sharepoints to which the second client device has access. Subsequently at 703, the encrypted sharing server retrieves, based on the search request with the second set of identifiers and the set of sharepoints, a second set of encrypted index data stored at each storage location from the set of storage locations using the set of logical block identifiers. After the set of encrypted index data associated with the search request have been retrieved, the encrypted sharing server compiles encrypted search result data (or an encrypted search result file) based on the set of encrypted index data, at 704. The encrypted sharing server then sends the encrypted search result data to client device at 705, together with encrypted symmetric keys.

In some instances, each encrypted index file from the set of encrypted index files to which the second client device has access is sent to the second client device. In other instances, where the second client device sends a request to the encrypted sharing server to access a subset of the set of encrypted index files based on a sharepoint or based on a user, the index files associated with that sharepoint can be sent to the second client device. For example, the second client device can send a request to the encrypted sharing server to access the encrypted index files associated with a specific sharepoint. For another example, the second client device can send a request to the encrypted sharing server to access the encrypted index files shared by a specific source device.

Upon receiving the encrypted search result data and encrypted symmetric keys, the second client device decrypts the symmetric keys with the private key of second client device and decrypts the encrypted search result data with the respective decrypted symmetric keys.

At 706, the encrypted sharing server receives a signal from the second client device to retrieve a document(s) listed in the search result data. The encrypted sharing server retrieves from the memory locations at the backend storage the encrypted document(s) indicated in the document selection and sends the encrypted document(s) to the second client device. In some instances, these documents are encrypted with symmetric keys (similar to the index file) and/or associated with sharepoints. The second client device can retrieve the symmetric keys from the encrypted sharing server and decrypt these documents using the symmetric keys for display or further processing. In some instances, these symmetric keys are encrypted by the public key of the second client device (similar to the index file). The second client device can decrypt the symmetric keys with the private key of second client device and then decrypt the documents with the symmetric keys for display or further processing. In some instances, these documents are encrypted with the public key of second client device. The second client device can decrypt these documents with the private key of second client device for display or further processing.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

While some steps in the processes and/or methods described with respect to the flow charts in FIGS. 6-7 are described to be performed by a specific module (e.g., the first client device, the encrypted sharing server, or the backend storage), in other embodiments, such steps can be performed by any other suitable module(s), processor(s), device(s) and/or the like.

While shown and described above as the encrypted sharing server or the client device (e.g., encrypted sharing server 215 or the client device 201 of FIGS. 2A and 2B) making a copy of a document (e.g., in encrypted form) when defining a new sharepoint (e.g., in response to a share request), in other instances a new pointer to a document can be defined. In such instances, each sharepoint authorizing access to a specific document (e.g., a specific index file) can be associated with a different encrypted pointer to that document. Each pointer associated with a different sharepoint can be encrypted using a different symmetric encryption key. In this manner, the same document can be retrieved and/or accessed using the pointers associated with different sharepoints. This ensures that the same data and/or document is retrieved, but that the sharepoints (and thus access to the document) remain distinct and secure from each other.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A method, comprising:

receiving, at an encrypted sharing server and from a source compute device, a share request to share first encrypted index data with a destination compute device;

defining, at the encrypted sharing server, a data record based on the share request, the data record including (1) information identifying the destination compute device and (2) a first set of logical block identifiers, the first set of logical block identifiers generated based on unencrypted index data associated with the first encrypted index data and associated with a first set of storage locations, each storage location from the first set of storage locations storing at least one index entry from a first set of index entries of the first encrypted index data;

receiving, at the encrypted sharing server and from the destination compute device, a search request to receive second encrypted index data associated with a search string, the search request including a second set of logical block identifiers generated based on the search string and associated with a second set of storage locations, each storage location from the second set of storage locations storing at least one index entry from a second set of index entries of the second encrypted index data;

identifying, at the encrypted sharing server and based on the information identifying the destination compute device in the data record, a subset of logical block identifiers included in the first set of logical block identifiers and the second set of logical block identifiers, the subset of logical block identifiers associated with a subset of index entries included in the first set of index entries and the second set of index entries; and sending, from the encrypted sharing server and based on the subset of logical block identifiers, a signal to cause the subset of index entries to be sent to the destination compute device in response to the search request such that the destination compute device can decrypt the subset of index entries to identify an index entry from the subset of index entries.

2. The method of claim 1, wherein the first set of logical block identifiers is a set of pseudorandom logical block identifiers generated at the source compute device based at least in part on the unencrypted index data.

3. The method of claim 1, wherein the data record includes a period of time during which the share request is active.

4. The method of claim 1, wherein the first set of logical block identifiers is generated using a cryptographic pseudorandom hash function with at least a portion of the unencrypted index data as an input to the cryptographic pseudorandom hash function.

5. The method of claim 1, wherein the second set of logical block identifiers is a set of pseudorandom logical block identifiers generated at the destination compute device based on a seed generated based at least in part on the search string.

6. The method of claim 1, wherein the first encrypted index data is encrypted at the source compute device using a symmetric key.

7. The method of claim 1, wherein:

the first encrypted index data is encrypted at the source compute device using a symmetric key, the symmetric key is encrypted at the source compute device using a public key of the destination compute device.

8. The method of claim 1, wherein:

the first encrypted index data is encrypted at the source compute device using a symmetric key, the symmetric key is encrypted at the source compute device using a public key of the destination compute device, the symmetric key is decrypted at the destination compute device using a private key of the destination compute device such that the destination compute device can decrypt the subset of index entries using the symmetric key.

9. The method of claim 1, wherein:

the first encrypted index data is encrypted at the source compute device based on index data prior to the receiving the share request, the encrypted sharing server does not store the index data in an unencrypted form.

10. The method of claim 1, wherein:

the share request is a first share request, the method further comprising:

receiving, at the encrypted sharing server and from the source compute device, a second share request to share third encrypted index data with the destination compute device; and updating, at the encrypted sharing server, the data record based on the second request to include a third set of logical block identifiers generated based on unencrypted index data associated with the third encrypted index data, the data record having a tree-like data structure with a first leaf and a second leaf, the first leaf associated with the first encrypted index data, the second leaf associated with the third encrypted index data.

11. The method of claim 1, wherein:

the source compute device is a first source compute device, the share request is a first share request, the data record is a first data record, the subset of logical block identifiers is a first subset of logical block identifiers, the method further comprising:

receiving, at the encrypted sharing server and from a second source compute device, a second share request to share third encrypted index data with the destination compute device;

defining, at the encrypted sharing server, a second data record based on the second share request, the second data record including information identifying the destination compute device and a third set of logical block identifiers, the third set of logical block identifiers associated with a third set of storage locations, each storage location from the third set of storage locations storing at least one index entry from a third set of index entries of the third encrypted index data;

identifying, at the encrypted sharing server and based on the second data record, a second subset of logical block identifiers included in the third set of logical block identifiers and the second set of logical block identifiers, the second subset of logical block identifiers associated with a second subset of index entries included in the third set of index entries and the second set of index entries; and removing, at the encrypted sharing server, each duplicate copy of an index entry in the first subset of index entries and the second subset of index entries to define a third subset of index entries, the sending the signal includes sending the signal to cause the second subset of index entries to be sent to the destination compute device.

12. A processor-readable non-transitory medium storing code representing instructions to be executed by a processor, the code comprising code to cause the processor to:

receive, from a source compute device, a share request to share first encrypted index data with a destination compute device;

define a data record based on the share request, the data record including (1) information identifying the destination compute device and (2) a first set of logical block identifiers, the first set of logical block identifiers generated based on unencrypted index data associated with the first encrypted index data and associated with a first set of storage locations, each storage location from the first set of storage locations storing at least one index entry from a first set of index entries of the first encrypted index data;

receive, from the destination compute device, a search request for second encrypted index data associated with a search string, the search request including a second set of logical block identifiers generated using a cryptographic pseudorandom hash function with at least a portion of the search string as an input to the cryptographic pseudorandom hash function, the second set of logical block identifiers associated with a second set of storage locations, each storage location from the second set of storage locations storing at least a portion of the second encrypted index data;

identify that the destination compute device is authorized to access third encrypted index data but not fourth encrypted index data mutually exclusive from the third encrypted index data, the second encrypted index data including the third encrypted index data and the fourth encrypted index data, the third encrypted index data being a subset of the first encrypted index data; and send, in response to the search request, a signal to cause the third encrypted index data to be sent to the destination compute device and not cause the fourth encrypted index data to be sent to the destination compute device such that the destination compute device can decrypt the third encrypted index data in response to receiving the third encrypted index data.

13. The processor-readable non-transitory medium of claim 12, wherein the second set of logical block identifiers is a set of pseudorandom logical block identifiers generated at the destination compute device based at least in part on the search string.

14. The processor-readable non-transitory medium of claim 12, wherein:

the third encrypted index data is decrypted at the destination compute device to define decrypted index data, and each duplicate copy of the index data in the decrypted index data is removed at the destination compute device in response to the third encrypted index data being decrypted.

15. The processor-readable non-transitory medium of claim 12, wherein:

the source compute device is a first source compute device, the third encrypted index data is encrypted with a first symmetric key at the first source compute device, and the fourth encrypted index data is encrypted with a second symmetric key at a second source compute device.

16. The processor-readable non-transitory medium of claim 12, wherein:

the source compute device is a first source compute device, a first portion of the third encrypted index data is encrypted with a first symmetric key at the first source compute device, a second portion of the third encrypted index data is encrypted with a second symmetric key at a second source compute device, the first symmetric key and the second symmetric key encrypted using a public key of the destination compute device, the code to cause the processor to send the signal includes code to cause the processor to send the signal such that the destination compute device decrypts the first symmetric key and the second symmetric key using a private key of the destination compute device associated with the public key of the destination compute device.

17. An apparatus, comprising:

a memory; and a processor operatively coupled to the memory, the processor configured to receive, from a source compute device, a share request to share first encrypted index data with a destination compute device, the processor configured to define a data record based on the share request, the data record including (1) information identifying the destination compute device and (2) a first set of logical block identifiers, the first set of logical block identifiers generated based on unencrypted index data associated with the first encrypted index data and associated with a first set of storage locations, each storage location from the first set of storage locations storing at least one index entry from a first set of index entries of the first encrypted index data the processor configured to receive, from the destination compute device, a search request to receive second encrypted index data associated with a search string, the search request including a second set of logical block identifiers generated based on the search string and associated with a second set of storage locations, each storage location from the second set of storage locations storing at least one index entry from a second set of index entries of the second encrypted index data, the processor configured to identify, based on the information identifying the destination compute device in the data record, a subset of logical block identifiers included in the first set of logical block identifiers and the second set of logical block identifiers, the subset of logical block identifiers associated with a subset of index entries included in the first set of index entries and the second set of index entries, and the processor configured to send, based on the subset of logical block identifiers, a signal to cause the subset of index entries to be sent to the destination compute device in response to the search request such that the destination compute device can decrypt the subset of index entries to identify an index entry from the subset of index entries.

18. The apparatus of claim 17, wherein:

the first set of logical block identifiers is generated based on a seed determined based at least in part on the first set of index entries.

19. The apparatus of claim 17, wherein:

the first set of logical block identifiers is generated using a cryptographic pseudorandom hash function with at least a portion of the first set of index entries as an input to the cryptographic pseudorandom hash function.

20. The apparatus of claim 17, wherein:

the first encrypted index data is encrypted at the source compute device using an encryption key, the encryption key is encrypted at the source compute device with a public key of the destination compute device such that the destination compute device can decrypt the encryption key with a private key of the destination compute device and decrypt at least one encrypted index entry from the first encrypted index data using the encryption key.

21. The apparatus of claim 17, wherein:

the processor is configured to receive, from the source compute device, the first encrypted index data, the processor is configured to store the first encrypted index data based on the first set of logical block identifiers.

* * * * *